(12) United States Patent
Hämäläinen et al.

(10) Patent No.: US 8,018,904 B2
(45) Date of Patent: Sep. 13, 2011

(54) ANTENNA SELECTION METHOD

(75) Inventors: Jyri Hämäläinen, Oulu (FI); Esa Tiirola, Oulu (FI)

(73) Assignee: Nokia Corporation, Espoo (FI)

( * ) Notice: Subject to any disclaimer, the term of this patent is extended or adjusted under 35 U.S.C. 154(b) by 475 days.

(21) Appl. No.: 10/526,547

(22) PCT Filed: Sep. 6, 2002

(86) PCT No.: PCT/IB02/03621
§ 371 (c)(1),
(2), (4) Date: Mar. 3, 2005

(87) PCT Pub. No.: WO2004/023674
PCT Pub. Date: Mar. 18, 2004

(65) Prior Publication Data
US 2006/0077935 A1 Apr. 13, 2006

(51) Int. Cl.
*H04W 4/00* (2009.01)
(52) U.S. Cl. ........ 370/334; 370/465; 370/328; 370/329; 370/395.21
(58) Field of Classification Search ................. 370/334, 370/465, 328, 329, 395.21
See application file for complete search history.

(56) References Cited

U.S. PATENT DOCUMENTS

| | | | | |
|---|---|---|---|---|
| 4,513,412 A | * | 4/1985 | Cox | 370/203 |
| 4,876,743 A | * | 10/1989 | Lindenmeier et al. | 455/133 |
| 5,515,378 A | * | 5/1996 | Roy et al. | 370/334 |
| 5,621,786 A | * | 4/1997 | Fischer et al. | 455/436 |
| 5,644,599 A | * | 7/1997 | Hess | 375/267 |
| 6,094,576 A | * | 7/2000 | Hakkinen et al. | 455/422.1 |
| 6,115,367 A | * | 9/2000 | Archambaud et al. | 370/334 |
| 6,643,318 B1 | * | 11/2003 | Parsa et al. | 375/141 |
| 7,013,146 B2 | * | 3/2006 | Wang et al. | 455/455 |
| 2002/0034191 A1 | * | 3/2002 | Shattil | 370/464 |
| 2002/0085513 A1 | * | 7/2002 | Moon | 370/328 |
| 2002/0159502 A1 | * | 10/2002 | Uesugi | 375/130 |
| 2003/0147655 A1 | * | 8/2003 | Shattil | 398/182 |
| 2004/0008614 A1 | * | 1/2004 | Matsuoka et al. | 370/203 |
| 2004/0014429 A1 | * | 1/2004 | Guo | 455/73 |
| 2006/0025079 A1 | * | 2/2006 | Sutskover et al. | 455/67.11 |

FOREIGN PATENT DOCUMENTS
EP 0 749 216 A1 12/1996

(Continued)

OTHER PUBLICATIONS

ETSI TS 125 211 V4.3.0: "Physical channels and mapping of transport channels onto physical channels (FDD); (3FPP TS 25.211 version 4.3.0 Release 4)" Universal Mobile Telecommunications System (UMTS), Dec. 2001, XP002239180, Retrieved from the Internet: <URL:http://www.etsi.org>.

(Continued)

*Primary Examiner* — Lester Kincaid
*Assistant Examiner* — Diego Herrera
(74) *Attorney, Agent, or Firm* — Squire, Sanders & Dempsey (US) LLP

(57) ABSTRACT

Embodiments of the invention provide a method and apparatus for initiating a telecommunications uplink from a mobile terminal to a telecommunications network. A preamble signal is transmitted from the mobile terminal to the network in accordance with a transmission parameter of the mobile terminal. The parameter is changed and the preamble retransmitted until successful receipt in the network is confirmed. Changing the transmission parameter alters the signal diversity of one or more preambles as received by the base station.

18 Claims, 5 Drawing Sheets

FOREIGN PATENT DOCUMENTS

| | | |
|---|---|---|
| EP | 0807989 | 11/1997 |
| JP | 10-117162 | 5/1998 |
| JP | 2001-268049 | 9/2001 |
| JP | 2002-528959 | 9/2002 |
| WO | 00/24152 | 4/2000 |
| WO | 00/55976 | 9/2000 |

OTHER PUBLICATIONS

Mogensen et al, "On antenna- and frequency diversity in GSM related systems (GSM-900, DCS-1800, and PCS1900)" Seventh IEEE International Symposium on Personal, Indoor and Mobile Radio Communications. PIMRC '96 (Cat. No. 96TH8240), Proceedings of PIMRC '96, Oct. 15-18, 1996, pp. 1272-1276 vol. 3, XP002239181.

Friedlander et al, "Beamforming vs. transmit diversity in the downlink of a cellular communications system", Conference Record of Thirty-Fifth Asilomar Conference on Signals, System and Computers (Cat. No. 01CH37256), Nov. 4-7, 2001, pp. 1014-1018, vol. 2, XP002239182.

Japanese Office Action dated Feb. 18, 2008.

* cited by examiner

ANTENNA SELECTION METHOD

FIELD OF INVENTION

The present invention relates to the field of parameter selection in relation to antenna, beam and carrier selection in mobile telecommunications devices, and more particularly to selection methods and apparatus for reducing connection establishment time in such devices.

The invention has been developed primarily for use in 3rd generation (3G) wideband code division multiple access (WCDMA) systems, and will be described hereinafter with reference to this embodiment. However, it will be appreciated that the invention is not limited to use in this area.

BACKGROUND TO INVENTION

MIMO (Multiple-Input Multiple-Output) and transmit diversity techniques have provided attractive solutions for increasing downlink capacity in wireless mobile networks and currently MIMO is being considered for WCDMA (Wideband Code Division Multiple Access) standardization for downlink transmission.

For various reasons, uplink multi-antenna transmission solutions have not been given much attention to date. In order to keep the costs and complexity of such handsets acceptable, it has been proposed that they only include a single full transmit (ie, uplink) chain and two receiver (ie, downlink) chains.

Lack of signal diversity can be a problem when transmitting common channels in a mobile telecommunications system. In the case of a mobile handset attempting to use the random access channel (RACH) procedure to establish an uplink (or two-way) connection, soft handover is not possible and thus no macro diversity gain can be obtained. The diversity problem exists if there is no (or only a small amount of) multipath or time diversity available in the radio channel.

Typical steps involved in the RACH procedure are shown in FIG. 1. An initial preamble P0 is sent by user equipment UE at a first, relatively low power. The downlink power is measured and the transmit power of the initial preamble P0 is set (based on the DL measurement) with the proper margin due to the open loop inaccuracy (open loop power control not being particularly accurate, since it is difficult to measure large power dynamics accurately in terminal equipment). Transmission of the first and subsequent preambles is commenced at the beginning of any of a number of pre-defined time slots, known as access slots. There are 15 access slots per two frames, and they are spaced 5120 chips apart. After transmitting the first preamble P0, the UE decodes the acquisition Indication Channel (AICH) to determine whether the base station BS has successfully received the preamble. In the event the first preamble P0 is not acquired by the BS, the power level is raised (typically by 1 dB) and a second preamble P1 sent at the new power level in the next available access slot. The AICH is decoded to check whether the BS received P1, and the process is repeated for further preamble signals, until a power level is reached where the AICH indicates reception of the last transmitted preamble at the BS.

Once a preamble is acknowledged by the BS, the UE transmits the 10 ms or 20 ms long message part that consists of control and data parts of the RACH transmission (transmission power of the message part is typically based on that of the latest (successful) preamble). For example, an IP address can be carried using the data part.

Whilst the UE is performing the RACH procedure, it is possible that the radio link between the UE and the BS is in deep fade. This means that multiple sequential preambles (with increased transmit power) must be transmitted to compensate the channel attenuation and to get the acceptable performance for the RACH reception. This increases the time taken for the RACH process to be successful, and in the meantime generates more interference to the other users of the RAN (Radio Access Network). Power consumption is also increased at the UE, which has a deleterious effect on battery life.

SUMMARY OF INVENTION

In accordance with a first aspect of the invention, there is provided a method of initiating a telecommunications uplink from a mobile terminal to a telecommunications network, the mobile terminal having a transmission chain including a baseband stage, a power amplification stage and an antenna, the method including the steps of:

(a) transmitting a preamble signal from the mobile terminal, the preamble signal being transmitted in accordance with a transmission parameter of the mobile terminal;

(b) determining whether a base station has successfully received the preamble signal and if so, establishing an uplink to the base station on the basis of the first transmission parameter;

(c) in the event it is not determined that a base station has successfully received the preamble signal, changing the transmission parameter, and repeating steps (a) and (b);

wherein the transmission parameter controls one or more of the baseband stage, power amplification stages and the antenna such that changing the transmission parameter in step (c) results in an alteration of the signal diversity of one or more preambles as received by the base station.

Preferably, the transmission chain includes at least two antennae, and the transmission parameter determines which of the antennae the preamble is transmitted from. More preferably, the preamble is transmitted from only one of the antennae at a time.

In one embodiment, the transmission parameter includes a frequency band, each preamble being transmitted via the frequency band indicated by the current transmission parameter.

In another embodiment, the transmission chain includes a plurality of antennae in an antenna array. Directionality of a beam formed by signals transmitted from the array is selected for each preamble transmission based on the transmission parameter. Preferably, the transmission chain includes a phase shifting means for shifting the phase of the signals supplied to the individual antennae in the antenna array, the phase shifters being controllable on the basis of the transmission parameter.

In a preferred embodiment, the uplink is established in accordance with the transmission parameter used when the base station successfully received the preamble.

Preferably, the transmission parameter includes a power level at which each preamble is transmitted, the power level being increased between at least some sequentially adjacent preamble transmissions.

According to a second aspect of the invention, there is provided a mobile telecommunications terminal configured to initiate a telecommunications uplink to a telecommunications network, the mobile terminal having a transmission chain including a baseband stage, a power amplification stage and an antenna and being configured to:

(a) transmit a preamble signal in accordance with a transmission parameter of the mobile terminal;

(b) determine whether a base station has successfully received the preamble signal and if so, to establish an uplink to the base station on the basis of the first transmission parameter;

(c) in the event it is not determined that a base station has successfully received the preamble signal, change the transmission parameter, and repeat (a) and (b);

wherein the transmission parameter controls one or more of the baseband stage, power amplification stages and the antenna such that changing of the transmission parameter in (c) results in an alteration of the signal diversity of one or more subsequent preambles as received by the base station.

BRIEF DESCRIPTION OF DRAWINGS

Preferred embodiments of the present invention will now be described, by way of example only, with reference to the accompanying drawings, in which.

DETAILED DESCRIPTION OF PREFERRED EMBODIMENT

Figure 1:
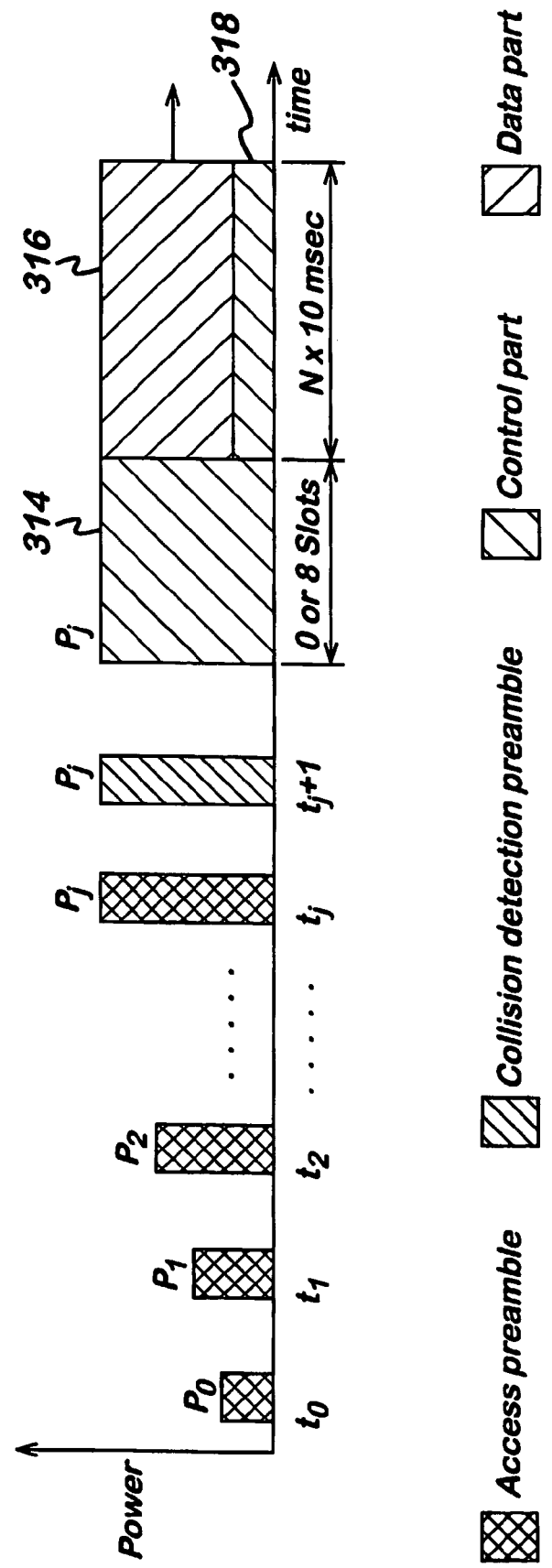
FIG. 1 is a graph showing the structure of a prior art common packet channel (CPCH) access transmission.

Referring to the drawings, there are shown a number of embodiments of the present invention, in which establishment of an uplink from a mobile handset is improved by changing transmission parameters between preamble transmissions. The intent of changing the transmission parameter is to improve the signal diversity between preamble transmissions, so as to increase the chance of each subsequent preamble transmission being successful.

Referring to FIG. 1, there is shown a series of steps taken over a time period to establish an uplink. The embodiment illustrated is a Common Packet Channel (CPCH) access transmission. More detail of the steps used in establishing an uplink channel via this procedure are detailed in "Physical Channels and Mapping of Transport Channels Onto Physical Channels (FDD)", v. 4.2.0, 3GPP, TS 25.211, the contents of which are incorporated herein by way of cross-reference. It will be appreciated that the steps involved are similar to those in the procedure applied to establishing a Random Access Channel (RACH), and corresponding principles apply in such an embodiment.

As described in relation to the prior art, the UE can start the random-access transmission at the beginning of any of a number of well-defined time intervals, denoted access slots. There are 15 access slots per two frames and they are spaced 5120 chips apart. The timing of the access slots and the acquisition indication is known to those skilled in the art and so is not described here in any detail.

Initially, a first preamble P0 is transmitted from a User Equipment (UE) at a first, relatively low, power level (based on DL measurement), which takes around 1 millisecond. This is performed in accordance with a first value of a transmission parameter. The meaning of "transmission parameter" is described in more detail in relation to the following embodiments.

After a short delay, the UE decodes the AICH (Acquisition Indication Channel) to see whether a Base Station (BS) has detected the preamble. In the event the UE detects that a BS has detected the preamble, it is presumed that the present power level is acceptable. However, in the present case, no BS has responded, so the UE increases the power level, changes the transmission parameter and retransmits the preamble. It is the changing of the transmission parameter that distinguishes the present invention from the prior art.

The steps of changing the transmission parameter and (in the preferred embodiment) the transmission power are repeated until the power cannot be increased any more, the operation times out or the AICH indicates that a BS has received the preamble.

Once the AICH has successfully been received by the UE, a collision detection (CD) procedure is performed. Collision in the CPCH means that two UEs have selected the same access channel and preamble at the same time. Using the CD mechanism, the probability of collision is decreased. WCDMA system utilises the CD mechanism in the Physical CPCH but it is not used in the Physical RACH. In the CD procedure, the UE randomly selects a CD signature and a CD access slot subchannel, then transmits the CD preamble. If the UE does not receive the CD-AICH in the designated slot it aborts access. If the UE receives the CD-AICH in the correct timeslot with matching signature, it continues the connection establishment (i.e., transmits possibly the power control preamble and finally starts data transmission immediately afterwards).

Figure 4:
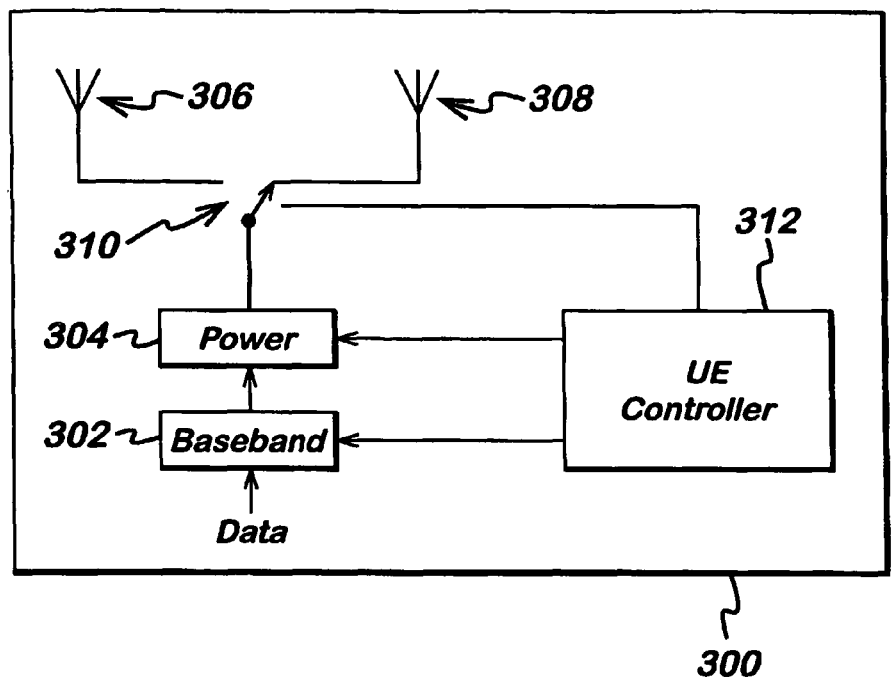
FIG. 4 is a schematic of a transmission chain in a mobile terminal, in accordance with the invention.
Figure 5:
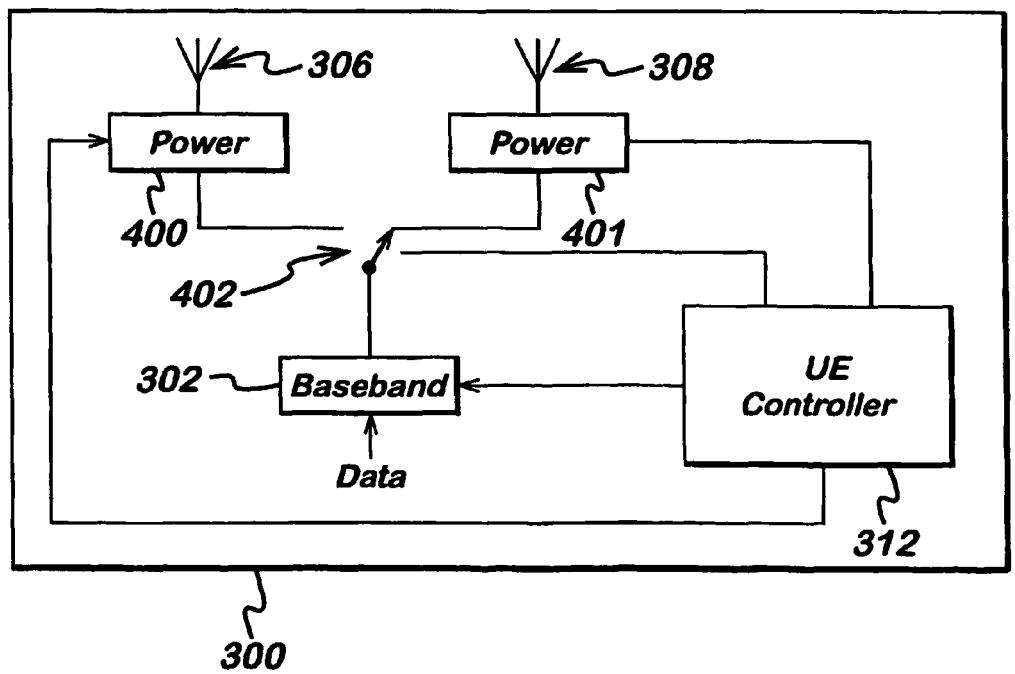
FIG. 5 is a schematic of an alternative transmission chain in a mobile terminal, in accordance with the invention.
Figure 6:
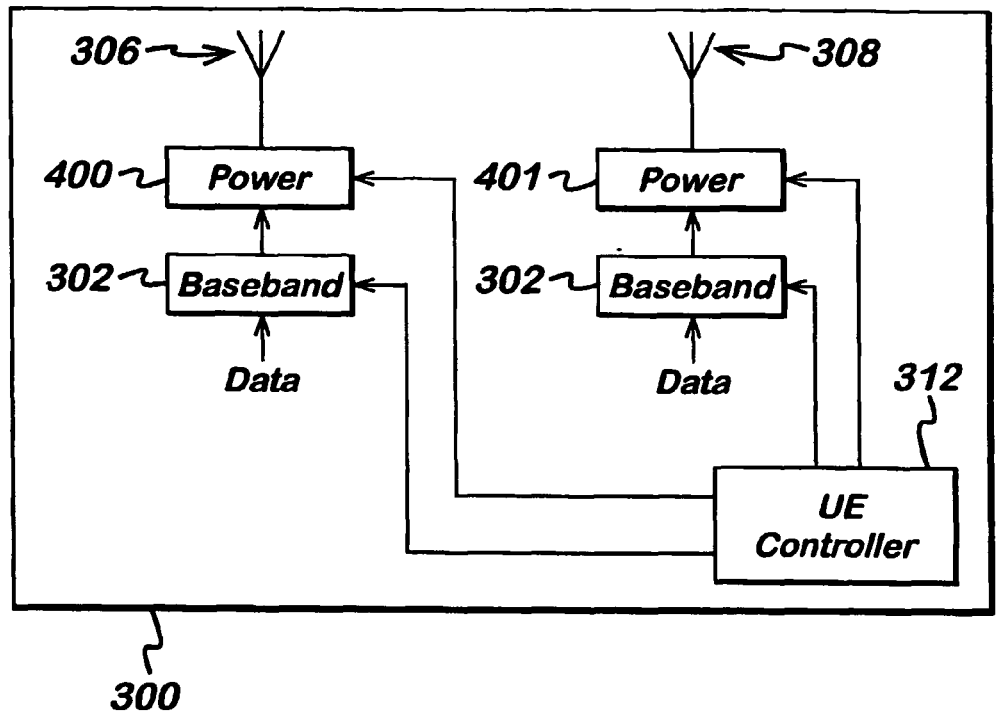
FIG. 6 is a schematic of yet another transmission chain in a mobile terminal, in accordance with the invention.

The transmission parameter can take many forms, some of which are described in relation to the embodiments in FIGS. 4 to 6. It will be appreciated that the UE in each case includes considerably more features and circuitry than that shown. However, for the purposes of clarity, only the minimum features necessary for understanding the invention are shown. For example, in addition to the various transmission chain components shown, most UE will also have a reception chain for, at the very least, receiving and decoding an acknowledgement signal from a BS.

Figure 3:
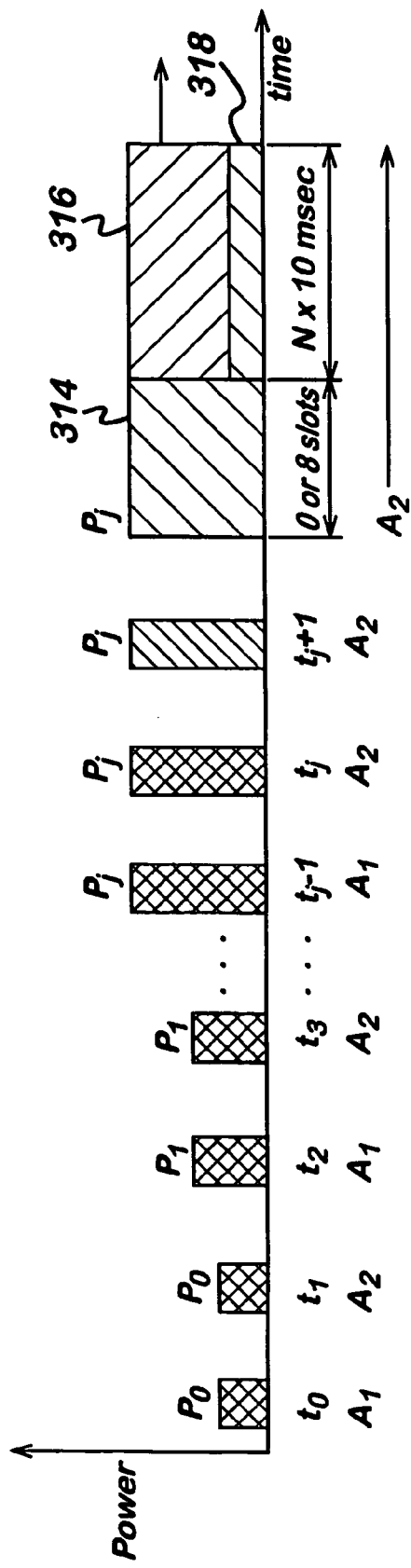
FIG. 3 is a graph showing the structure of an alternative CPCH access transmission embodiment, according to the invention.

Referring to FIG. 3, there is shown a UE 300 in the form of mobile telephone. It will be appreciated that the UE can take the form of any mobile telecommunications device, such a Personal Digital Assistant (PDA), portable computer, or any combination of devices capable of communicating via a radio telecommunications network.

The UE includes three main functional aspects: a baseband stage 302, a power amplification stage 304, and, in this case, two antennae 306 and 308 connected to the output of the power amplification stage 304 via a switch 310. The baseband stage 302 does all of the manipulation required to take a digital voice or data signal and perform RF processing such that the voice or data can be transmitted from the UE. The baseband stage 302 also manipulates control signals and any other data that needs to be transmitted from the UE.

The power amplification stage 304 takes the processed signal from the baseband stage 302 and amplifies it, before supplying it to the switch 310. The switch 310 is controlled by UE controller 312 to supply the output of the power amplification stage 304 to either the first antenna 306 or the second antenna 308, as required. It will be appreciated that in the usual case where the antenna is for transmitting and receiving, the switch can also be controlled to switch either or both of the antennae to a receiver chain, depending upon the configuration and requirements of the UE and the network within which it operates.

To initiate an uplink connection, the baseband stage 302 provides a first preamble signal to the power amplification stage 304. The UE controller 312 controls the power amplification stage such that it outputs a first, relatively low power signal, whilst the switch 310 is controlled to feed the output of the power amplification stage to the first antenna 306, from which the preamble is transmitted.

Once the first preamble has been transmitted, the UE decodes the AICH via the receiving chain (not shown) to ascertain whether a BS has received the preamble. If the AICH is not detected, then the transmission parameter is changed. In the embodiment of FIG. 3, this means that the switch is controlled to reroute the output of the power amplification stage 304 to the second antenna 308.

In one embodiment, the preamble is then re-broadcast at the appropriate time to coincide with the next access slot, at a higher power level than the first transmission at time $t_j$. If the AICH is not then detected, the power is increased and the preamble retransmitted. The retransmission at this stage can be to either the first or the second antenna, although it will usually be preferable to switch back to the first antenna for the third transmission of the preamble. If the AICH continues not to be detected, then the preamble is retransmitted with the power level increasing with each transmission, and the antenna being switched either every transmission or every second transmission.

Figure 2:
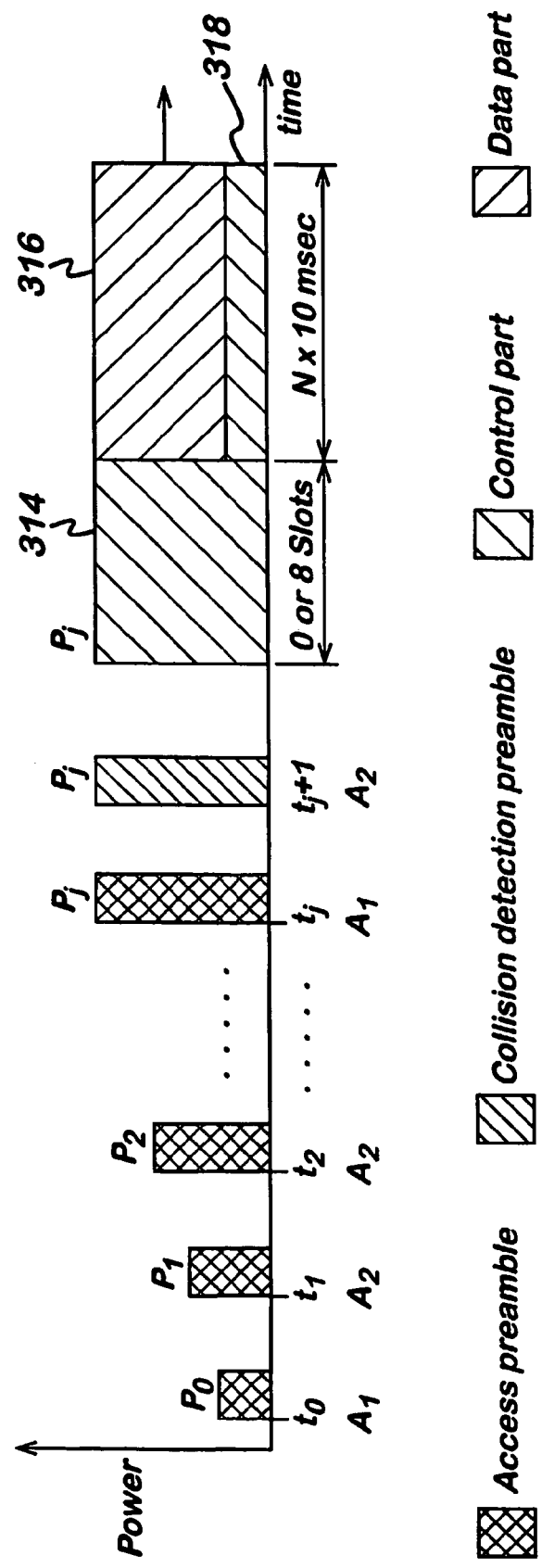
FIG. 2 is a graph showing the structure of a CPCH access transmission, according to the invention.

FIG. 2 shows an embodiment of such a scheme, in which the power increases with each preamble transmission. The antenna, in this case, is switched only every second transmission after the first two transmissions. In this case, the preamble is successfully received by the first antenna at time $t_j$ at power $p_j$.

In an alternative embodiment, shown in FIG. 3, the power is not increased with each preamble transmission after the first; rather, it is only increased every second transmission. It is indicated under each preamble transmission in FIG. 3 which antenna is used, $A_1$ being the first antenna and $A_2$ being the second. The antenna sequence shown is ($A_1$, $A_2$, $A_2$, $A_1$, ... ), but this could also be ($A_1$, $A_2$, $A_1$, $A_2$, ... ) due to the additional diversity offered by the antenna swapping. In the illustrated case, the preamble is again received at time $t_j$ at power $p_j$, but it will be noted that antenna $A_2$ is selected, and that power $p_j$ is the same as for the previous preamble sent at time $t_i$.

In the embodiments of FIGS. 2 and 3, the effect is that each transmission will have a different chance of reaching a BS, because it will be via a different antenna and/or at a different power to the previous preamble transmission.

The structure of FIG. 4 can also support other embodiments. For example, in addition to altering the antenna through which the preamble is being transmitted, the transmission parameter can also switch the baseband frequency to that of a different carrier. In proposed WCDMA systems, carrier spacing is 5 MHz, meaning that there will be relatively little correlation between even adjacent carriers when considering fast-fade channel characteristics.

Turning to FIG. 5, there is shown an alternative embodiment of the UE 300 shown in FIG. 4, wherein like features are indicated with like numerals. However, in this case, there are two parallel power amplification stages 400 and 401, which accept the output of the baseband stage 302 via a switch 402. The operation of the UE is similar to that described in relation to the FIG. 4 embodiment, except that the switch 402 is responsive to a transmission parameter to determine which antenna the preamble is being sent to. The power amplification stages are individually controlled such that the output power is ramped up every (or every second) preamble transmission.

Another embodiment of the invention is shown in FIG. 6, in which there are two complete parallel transmission chains. In this case, there is no need for a switch to control which antenna receives a signal. Rather, the UE controller determines which baseband stage outputs the preamble at any given time. In this case, it is even possible to transmit preambles simultaneously, thereby further reducing the average access time, albeit with a power consumption penalty. This embodiment also allows increased data rates, because the transmission chains can be operated to transmit data simultaneously once the preamble procedure is completed.

In each of the precious embodiments, there is disclosed a pair of antennae. However, it will be appreciated by those skilled in the art that further diversity can be attained by incorporating additional antennae in the UE and correspondingly modifying, or adding to, the disclosed transmission chains.

Figure 7:
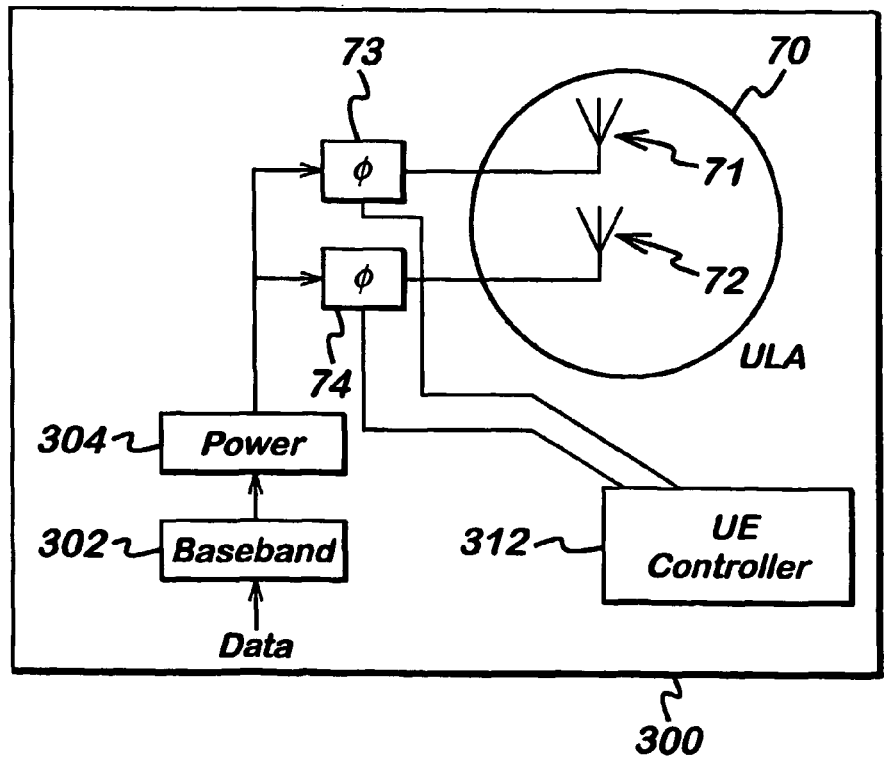
FIG. 7 is a schematic of an alternative transmission chain in a mobile terminal, utilising a Uniform Linear Antenna (ULA) array.

The embodiments can also be modified to take into account steered beam transmission via a ULA (Uniform Linear Antenna) array of any suitable size and configuration. FIG. 7 shows an example in which a ULA 70 includes first and second antennae 71 and 72, which are spaced apart by (lambda/2), where lambda is the wavelength of the signal of interest. The first and second antennae 71 and 72 are fed signals from a power amplifier 304 by way of respective phase shifters 73 and 74. The phase change of each phase controller is independently controlled by the UE controller 312. Using this arrangement, it is possible to generate two (or more) fixed beams in pre-defined directions (e.g., ±90 degrees). The beams are controlled by the UE controller via the phase shifters such that the signal is transmitted directionally, as is well understood by those skilled in the art of beamsteering. In this embodiment, the transmission factor is the direction of the beam. By changing the beam (and optionally the carrier frequency), antennae diversity is improved over multiple attempts at transmitting a preamble.

It will be appreciated that the embodiment of FIG. 7 can be altered such that the power amplifier 304 is removed and replaced with individual amplifiers between the phase-shifters 73 and 74 and their respective antenna 71 and 72.

It will be understood that in all the ULA embodiments, other numbers of antennae can be used.

Those skilled in the art will appreciate that certain combinations of the different embodiments can be used, as long as the overall diversity changes between at least some preamble transmissions.

The present invention provides a number of embodiments of a system in which antennae diversity is used in establishing an uplink connection from a mobile telecommunications device in a radio telecommunications network. The preferred embodiment is applied in a 3GPP WCDMA FDD system. However, it will be appreciated that the invention has application under other standards where improved antennae diversity provides an improvement over simply ramping up power over multiple preamble transmission attempts. For example, GSM/EDGE uses a similar RACH procedure to that described above, although the corresponding time delays are longer and thus reductions in time delay arising from improved antennae diversity are likely to be smaller than the WCDMA case.

The main advantage arising from the preferred embodiments is a (on average) shorter RACH procedure. This will speed up the call setup process and cause smaller delays for user data transmission on RACH and CPCH. This means that the transmission time that is needed to transmit small data packets via uplink RACH and CPCH is reduced. This is of particular importance where Internet Protocol (IP) addresses are transmitted via RACH (and CPCH).

By speeding up RACH procedures, IP connection embodiments can also work more quickly. An acceleration of the call setup and RACH processes translates into a decrease in delay for users in, for example, a World Wide Web browsing application.

Alternatively (or in addition, depending upon the embodiment), the average transmission power of the UE is also reduced. This increases the UL capacity and coverage, especially in a WCDMA scenario where a reduction of the average transmission power of a UE causes less interference to other users of the network.

Although the invention has been described with reference to a number of specific embodiments, it will be appreciated by those skilled in the art that the invention can be embodied in many other forms.

The invention claimed is:

1. A method of initiating a telecommunications uplink from a mobile terminal to a telecommunications network, the mobile terminal having a transmission chain including a baseband stage, a power amplification stage and an antenna, the method comprising:
   transmitting a preamble signal from the mobile terminal at a first time, the preamble signal being transmitted in accordance with at least two variable transmission parameters of the mobile terminal; and
   determining whether a base station has successfully received the preamble signal;
   in the event it is not determined that a base station has successfully received the preamble signal, changing at least one of the transmission parameters, and repeating the transmitting of the preamble signal and the determining whether a base station has successfully received the preamble signal at a time later than the first time,
   wherein each time it is not determined that a base station has successfully received the preamble signal, the changing at least one of the transmission parameters comprises varying a transmission parameter of the preamble signal that is different from a transmission parameter varied in the previous transmission, and
   wherein the changing at least one of the transmission parameters results in an alteration of a signal diversity of one or more preambles as received by the base station at the later time.

2. The method according to claim 1, wherein the transmission chain includes at least two antennae, and the transmission parameter determines which of the antennae the preamble is transmitted from.

3. The method according to claim 2, wherein the preamble is transmitted from only one of the antennae at a time.

4. The method according to claim 1, wherein the transmission parameter indicates a frequency band, each preamble being transmitted via the frequency band indicated by the current transmission parameter.

5. The method according to claim 1, wherein the transmission chain includes a plurality of antennae in an antenna array, and directionality of a beam formed by signals transmitted from the array is selected for each preamble transmission based on the transmission parameter.

6. The method according to claim 5, wherein the transmission chain includes a phase shifting means for shifting the phase of the signals supplied to the individual antennae in the antenna array, the phase shifters being controllable on the basis of the transmission parameter.

7. The method according to claim 1, wherein the uplink is established in accordance with the transmission parameter used when the base station successfully received the preamble at the first time or at a later time than the first time.

8. The method according to claim 1, wherein the transmission parameter includes a power level at which each preamble is transmitted, the power level being increased between at least some sequentially adjacent preamble transmissions.

9. An apparatus, comprising:
   a transmission chain including a baseband stage, a power amplification stage and an antenna;
   a transmitter configured to transmit a preamble signal in accordance with at least two variable transmission parameters of the apparatus at a first time;
   a determiner configured to determine whether a base station has successfully received the preamble signal; and
   in the event it is not determined that a base station has successfully received the preamble signal, a changing unit is configured to change at least one of the transmission parameters, and repeat the transmission of the preamble signal and the determination of whether the base station has successfully received the preamble signal at a time later than the first time,
   wherein each time it is not determined that a base station has successfully received the preamble signal, the changing of the at least one of the transmission parameters by the changing unit comprises varying a transmission parameter of the preamble signal that is different from a transmission parameter varied in the previous transmission, and
   wherein the changing of the at least one of the transmission parameters by the changing unit results in an alteration of a signal diversity of one or more subsequent preambles as received by the base station at the later time.

10. The apparatus according to claim 9, wherein the transmission chain includes at least two antennae, and the transmission parameter is configured to determine which of the antennae the preamble is transmitted from.

11. The apparatus according to claim 10, wherein the preamble is transmitted from only one of the antennae at a time.

12. The apparatus according to claim 9, wherein the transmission parameter is configured to indicate a frequency band, each preamble being transmitted via the frequency band indicated by the current transmission parameter.

13. The apparatus according to claim 9, wherein the transmission chain includes a plurality of antennae in an antenna array, and directionality of a beam formed by signals transmitted from the array is selected for each preamble transmission based on the transmission parameter.

14. The apparatus according to claim 13, wherein the transmission chain includes a phase shifter configured to shift the phase of the signals supplied to the individual antennae in the antenna array, the phase shifters being controllable on the basis of the transmission parameter.

15. The apparatus according to claim 9, wherein the uplink is established in accordance with the transmission parameter used when the base station successfully received the preamble at the first time or at a later time than the first time.

16. The apparatus according to claim 9, wherein the transmission parameter includes a power level at which each preamble is transmitted, the power level being increased between at least some sequentially adjacent preamble transmissions.

17. A computer-readable medium encoded with a computer program, the computer program configured to control a processor to perform operations comprising:

transmitting a preamble signal from a mobile terminal at a first time, the preamble signal being transmitted in accordance with at least two variable transmission parameters of the mobile terminal;

determining whether a base station has successfully received the preamble signal; and in the event it is not determined that a base station has successfully received the preamble signal, changing at least one of the transmission parameters, and repeating the transmitting of the preamble signal and the determining whether a base station has successfully received the preamble signal at a time later than the first time, wherein each time it is not determined that a base station has successfully received the preamble signal, the changing at least one of the transmission parameters comprises varying a transmission parameter of the preamble signal that is different from a transmission parameter that was varied in the previous transmission, and wherein the changing at least one of the transmission parameters results in an alteration of a signal diversity of one or more preambles as received by the base station at the later time.

18. An apparatus, comprising:

a transmission chain including a baseband stage, a power amplification stage and an antenna;

transmitting means for transmitting a preamble signal in accordance with at least two-transmission parameters of the apparatus at a first time;

determining means for determining whether a base station has successfully received the preamble signal; and in the event it is not determined that a base station has successfully received the preamble signal, changing means for changing at least one of the transmission parameters, and repeating the transmission of the preamble signal and the determination of whether the base station has successfully received the preamble signal at a time later than the first time, wherein each time it is not determined that a base station has successfully received the preamble signal, the changing of the at least one of the transmission parameters by the changing means comprises varying a transmission parameter of the preamble signal that is different from a transmission parameter varied in the previous transmission, and wherein the changing of the at least one of the transmission parameters by the changing unit results in an alteration of a signal diversity of one or more subsequent preambles as received by the base station at the later time.

* * * * *